United States Patent [19]

Siemiatkowski et al.

[11] Patent Number: 5,138,140
[45] Date of Patent: Aug. 11, 1992

[54] SIGNATURE CAPTURE USING ELECTRO-OPTICAL SCANNING

[75] Inventors: Bish Siemiatkowski, Los Gatos, Calif.; Ynjiun P. Wang, Port Jefferson Station, N.Y.; Stephen J. Shellhammer, Bayport, N.Y.; Joseph Katz, Stony Brook, N.Y.; Timothy Williams, Hicksville, N.Y.

[73] Assignee: Symbol Technologies, Inc., Bohemia, N.Y.

[21] Appl. No.: 571,510

[22] Filed: Aug. 22, 1990

[51] Int. Cl.$^5$ .................. G06K 7/10; G06K 9/00; G06K 9/20; G09C 3/00
[52] U.S. Cl. .................... 235/462; 235/470; 235/487; 283/75; 382/13; 382/61
[58] Field of Search ............... 235/487, 494, 462, 470, 235/472; 283/904, 75, 81, 70, 69, 78; 382/3, 13, 59, 61

[56] References Cited

U.S. PATENT DOCUMENTS

| | | | |
|---|---|---|---|
| 3,832,686 | 8/1974 | Bilgutay | 382/59 |
| 4,364,024 | 12/1982 | Paetsch | 382/3 |
| 4,433,436 | 2/1984 | Carnes | 235/487 |
| 4,598,935 | 7/1986 | Stewart | 283/81 |
| 4,728,784 | 3/1988 | Stewart | 235/487 |
| 4,794,239 | 12/1988 | Allais | 235/462 |
| 4,816,661 | 3/1989 | Krichever et al. | 235/455 |
| 4,855,981 | 8/1989 | Kimura et al. | 235/470 |
| 4,995,642 | 2/1991 | Juszak et al. | 283/81 |

Primary Examiner—Stuart S. Levy
Assistant Examiner—Christopher R. Glembocki

[57] ABSTRACT

Two-dimensional information such as a written signature can be captured and subsequently reconstructed by using an electro-optical scanner. A multi-row preamble code and a multi-row postamble code flank the signature, and each code has a row identifier for identifying which row is being scanned by a scan line emitted by the scanner, as well as start/stop data for identifying when each scan line traverses the boundaries of a space containing the signature.

14 Claims, 2 Drawing Sheets

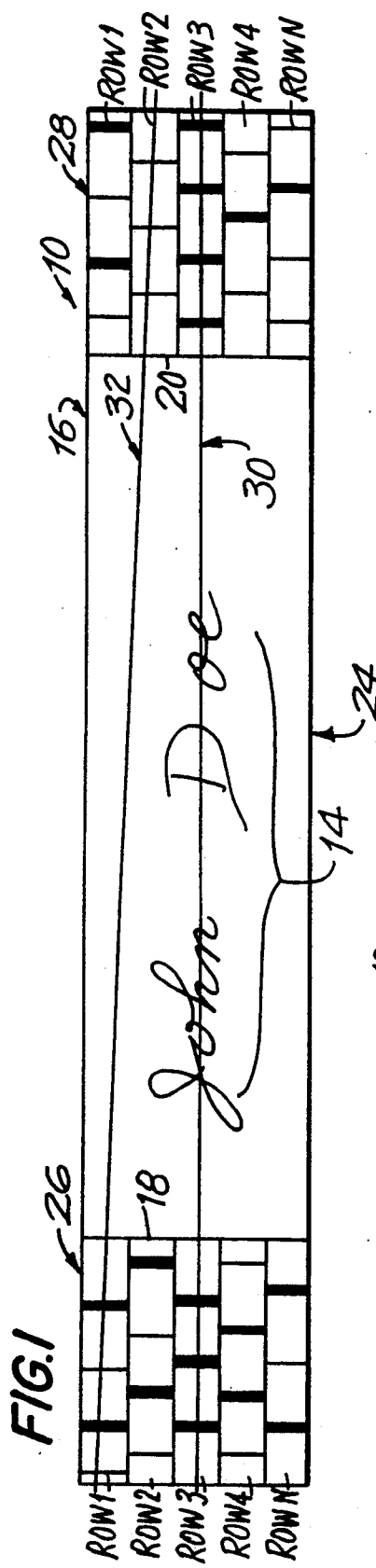
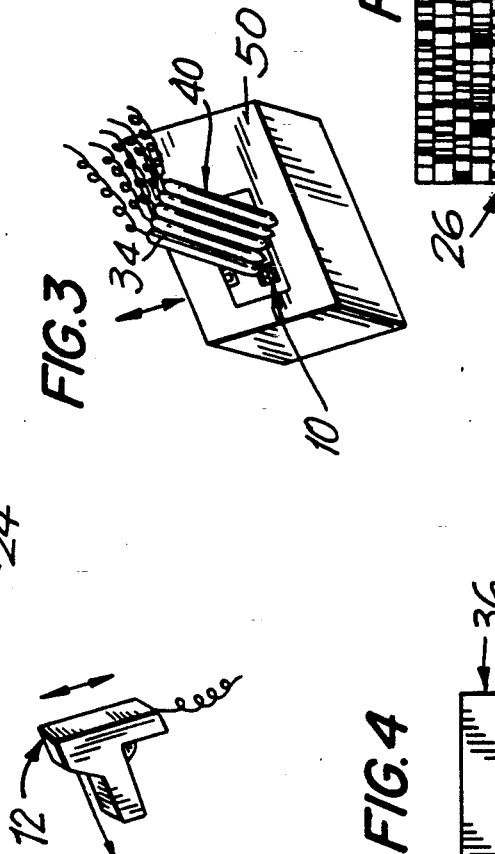
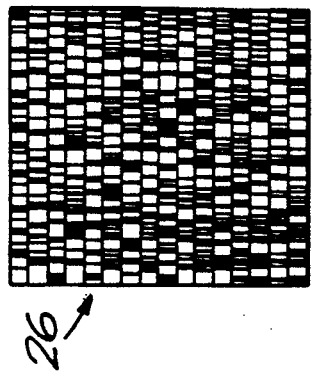
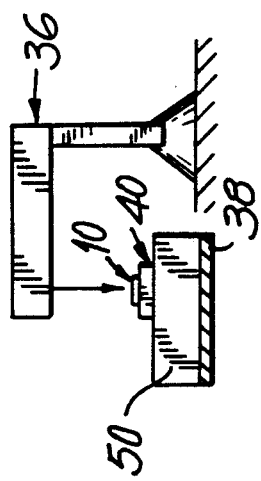
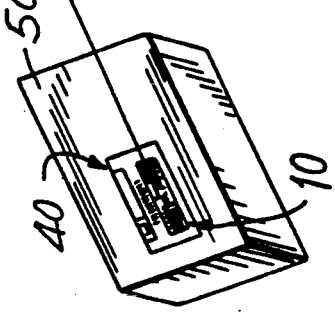

SIGNATURE CAPTURE USING ELECTRO-OPTICAL SCANNING

BACKGROUND OF THE INVENTION

1. Field of the Invention

This invention generally relates to an arrangement for, and a method of, electro-optically capturing indicia such as a signature acknowledging receipt of a delivery and, more particularly, to using an electrooptical scanner for such signature capture.

2. Description of Related Art

Many delivery services affix tracking labels to articles such as letters, parcels, packages and like items to be delivered. The tracking labels are preprinted with various indicia such as a human-readable tracking number, and a corresponding machine-readable coded symbol which decodes into the tracking number. The tracking number uniquely identifies the article, and is employed for various purposes, particularly for tracking the whereabouts of the article in a delivery network.

The coded symbol on the tracking label is typically a Universal Product Code (UPC) symbol which is broadly accepted as the primary means for automatically identifying and tracking objects. The UPC symbol is a linear array of bars and spaces having varying widths and different light reflectivities. The UPC symbol is electro-optically scanned, and read by laser scanning systems, including hand-held laser scanning heads, desk-top workstations and hand-held wands. The automatic reading by such systems eliminates human reading errors.

The preprinted tracking label also contains or could contain spaces for receiving various indicia. For example, a receipt acknowledgement space is provided for recording the receiver's name. The receiver signs or prints his or her name in the receipt acknowledgement space. Other spaces may be provided to record such information as time of arrival or any other remarks deemed necessary.

Articles are often delivered not to the named addressee, but, in the case of a business, to a central receiving office for re-delivery to an individual addressee. In any event, when the addressee does not receive the article by the expected deadline, urgent inquiries are made to the delivery service as to the identity of the person who signed the receipt acknowledgement. Despite such urgency, the delivery personnel cannot readily answer such inquiries without looking at the label itself which bears the receiver's signature. Since the label is often stored at a location remote from the delivery service personnel, unavoidable delays occur in readily answering such inquiries. This often leads to customer annoyance.

In an attempt to deal with such inquiries, the art has suggested a resistive matrix platen positioned underneath the receipt acknowledgement space on the label. The receiver's signature is captured in the form of electrical signals generated by a writing implement pressing against the platen during the course of signing or printing one's name. These electrical signals are collected, stored, and can subsequently be retrieved by the delivery service personnel to more readily answer customer inquiries without having to physically examine the label itself.

Although generally satisfactory for its intended purpose, such resistive matrix labels are very expensive to make and, in any event, are not always dependable. Inadequate pressure below a certain threshold can result in no information being recorded by the matrix platen. Some receivers do not take the time or trouble to firmly press against the platen.

SUMMARY OF THE INVENTION

1. Objects of the Invention

It is a general object of this invention to advance the state of the art of capturing indicia, particularly receipt acknowledgement signatures.

It is another object of this invention to electro-optically capture indicia using an electrooptical scanner, preferably of the moving beam or flying spot type.

Another object of this invention is to reliably capture indicia for subsequent retrieval for a wide variety of uses.

A further object of this invention is to conveniently and inexpensively provide a means for identifying a person on a label.

2. Features of the Invention

In keeping with these objects, and others which will become apparent hereinafter, one feature of this invention resides, briefly stated, in an identification structure for use with an electro-optical scanner operative for scanning light along scan lines. Such scanners suitable for this purpose can be found by reference to any one of the following U.S. Pat. Nos.: 4,387,297; 4,409,470; 4,816,660 and 4,896,026. In a preferred embodiment of each of these patents, the scanner produces at least one scan line of light which extends over a symbol to be read.

The identification structure comprises means defining a space for receiving indicia to be scanned and captured by the scanner. The space includes opposite boundaries spaced apart of each other and extends along a longitudinal direction, and also extends over a transverse distance along a transverse direction perpendicular to the longitudinal direction. The space has occupied pixels or zones containing indicia, and non-occupied zones free of indicia. The occupied zones present a different light reflectivity to the scan lines than the non-occupied zones.

Multi-row preamble code means and multi-row postamble code means are respectively located at the opposite boundaries of the space. Each code means includes electro-optically scannable and readable encoded data arranged in a plurality of rows tiered along the transverse direction over the transverse distance of the space. Each row extends along the longitudinal direction. The data include row identifier data for identifying which row is being scanned by a respective scan line, and start/stop data for identifying when each scan line traverses the boundaries of the space.

In a preferred embodiment, the space is rectangular, and is sized to receive a signature or analogous marking of the recipient of an article whose receipt is to be acknowledged. Each coded means and the space defining means are printed on a label to be applied to the article.

Other applications are contemplated by this invention. For example, in a so-called "electronic lock" application, a sample authorized signature is stored in a memory component and subsequently compared with another signature to gain or deny access to a secured location, depending on whether or not a match is made. The secured location can be premises or such items as automated teller machines or ticket machines operative for respectively dispensing money, tickets and the like.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is an identification structure with scan lines superimposed thereon in accordance with this invention;

FIG. 2 is a perspective view of the identification structure of FIG. 1 used with a hand-held electro-optical scanner;

FIG. 3 is a view analogous to FIG. 2 of the identification structure of FIG. 1 used with a handheld wand;

FIG. 4 is a side elevational view of the identification structure of FIG. 1 used in a fixed workstation environment;

FIG. 6 is an identification code in accordance with a preferred embodiment of this invention.

DETAILED DESCRIPTION OF THE PREFERRED EMBODIMENTS

Figure 5:
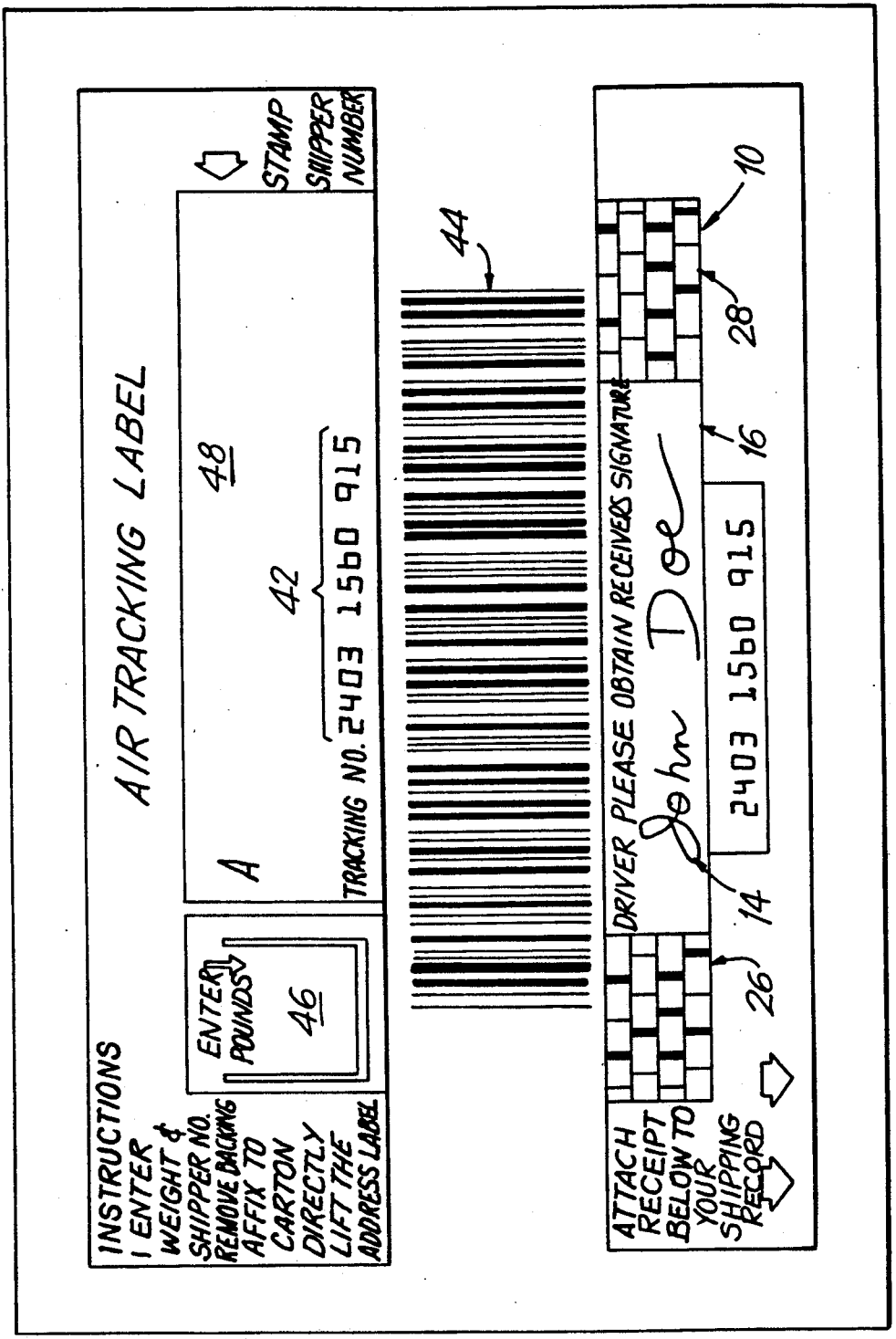
FIG. 5 is the identification structure of FIG. 1 incorporated in a tracking label for acknowledging receipt of a delivery.

Referring now to FIG. 1, reference numeral 10 generally identifies an identification structure for use with an electro-optical scanner operative for scanning light along at least one scan line. Electrooptical scanners suitable for this purpose can be found by reference to any one of the following U.S. Pat. Nos.: 4,387,297; 4,409,470; 4,816,660 and 4,896,026, all of which are assigned to the same assignee as the instant application. The entire contents of all said patents are incorporated herein by reference thereto.

Each of the aforementioned patents describes in at least one embodiment a hand-held scanning head in which a light source, preferably a gas or semiconductor laser, is mounted. Optical components are used to form the light beam emitted by the light source into a beam spot. The beam spot may be positioned immediately outside the head or at a desired distance therefrom. A scanning component sweeps the beam spot to form a scan line. An operator positions the scan line over a symbol to be scanned. Light reflected off the symbol is detected by a photosensor mounted within the head. The photosensor generates electrical analog signals indicative of the variable intensity of light reflected off the different light-reflective parts of the symbol. The analog signal is converted to a digitized signal which is thereupon decoded in accordance with an algorithm stored in a memory chip, all under the control of a programmed microprocessor. The decoded signal uniquely identifies the symbol and may be stored on-board the head or conducted off-board to a host computer. The symbol is thus read.

In accordance with one feature of this invention, the same basic scanner, as exemplified by reference numeral 12 in FIG. 2, is used for an additional purpose, that is, to read and capture indicia 14 provided in a space 16. The indicia 14 are different from a machine-readable coded symbol such as a UPC symbol. As illustrated and described herein in connection with FIG. 1, the indicia 14 are an individual's signature. However, this was done merely for ease of illustration and description because this invention is not intended to be limited solely to capturing signatures rendered in manuscript form, but can equally well cover the capture of any image or stamped or printed signatures or markings of any kind including fingerprints or other signs, symbols, logos or insignias.

The space 16 has an anterior boundary line 18 and a posterior boundary line 20 spaced along a longitudinal direction. Preferably, but not necessarily, the space 16 has a side boundary line 22 and another side boundary line 24 spaced apart a transverse distance along a transverse direction perpendicular to the longitudinal direction. As illustrated, the space 16 is rectangular in plan view, although other shapes are contemplated. In a preferred embodiment, the distance between the boundary lines 18, 20 is about 2.7", and the distance between side boundary lines 22, 24 is about 0.4".

The signature 14 is rendered in the space 16 and occupies certain zones or pixels thereof. The space can be considered as being comprised of a multitude of zones arranged in an array of longitudinally-extending rows and transversely-extending columns. The smaller each zone, the more signature information will be captured and the greater the resolution of the captured signature. In theory, an infinite number of rows and columns would provide the sharpest resolution. In practice, about 100 zones per linear inch are adequate to produce a satisfactorily resolved signature.

The occupied zones, i.e. those having parts of the signature, present a different light reflectivity to the scanner than the non-occupied zones, i.e. those having no parts of the signature. The occupied zones are akin to bars, while the non-occupied zones are akin to spaces of a UPC symbol. The occupied zones represent binary ones, and the non-occupied zones represent binary zeros. When a scan line of the scanner 12 traverses a row of zones in the space, the occupied zones reflect less light than the non-occupied zones, and this light-variable information can be processed into data representative of the signature in a manner completely analogous to that already known in the art for processing a UPC symbol.

However, unlike a UPC symbol, which is one-dimensional and can be scanned and read by a scan line anywhere along its height (i.e. the transverse "Y" axis), a signature is two-dimensional since it contains different information in both the longitudinal ("X" axis) and the transverse ("Y" axis) directions. To decode a two-dimensional signature, it is further necessary to know which row of zones is being scanned by a particular scan line and also when each scan line enters and exits the space containing the signature.

This invention proposes using a multi-row preamble code means 26, and a multi-row postamble code means 28, respectively located forwardly and rearwardly of the space 16 as considered along the longitudinal direction. Each code means is a multi-tiered symbol structure having electro-optically scannable and readable encoded data arranged along the longitudinal and transverse directions. Each symbol structure can be a unique two-dimensional marking symbol structure, a tiered bar code, or a new symbol structure compatible with prevailing standard bar code symbology. A multi-row tiered bar code suitable for use herein as the code means 28, 30 is disclosed in U.S. Pat. No. 4,794,239, the contents of which are hereby incorporated herein by reference. See, also, FIG. 6.

Each code means 26, 28 arranges its encoded data in a plurality of longitudinally-extending rows 1, 2, 3, 4 . . . N, where N is a substantially large enough number to provide adequate resolution of the signature. In theory, an infinite number of rows would provide the sharpest resolution, but, in practice, 25 rows are sufficient to provide an adequately resolved signature. The rows are tiered, i.e. stacked one above another, in the transverse direction.

Each row of encoded data includes row identifier means for identifying which row is being scanned at a particular time by a scan line. As shown in FIG. 1, for horizontal scan line 30, the row identifier means of code means 26, 28 each contains data that identifies the row being scanned at that moment as being row 3. As also shown in FIG. 1, for inclined scan line 32, the row identifier means of preamble code means 26 contains data that identifies the row being scanned at that moment as being row 1, while the row identifier means of postamble code means 28 contains data that identifies the row being scanned at that moment as being row 2.

Each row of encoded data also includes synchronizing means, i.e. start/stop data, for identifying when each scan line traverses the anterior and posterior boundary lines of the space 16.

In use, it will be initially assumed that the scanner 12 emits a scan line which is positioned, as is scan line 30, horizontally across the symbol structure 10 with a zero slope, i.e. where the same numbered row of both the preamble and postamble code means is traversed by the same scan line. The scan line 30 overscans the symbol structure 10. For example, a 4" linear scan is sufficiently long to cover the lengths of the preamble and postamble code means as well as the space 16. The overscan also helps minimize uneven beam spot speed at the ends of the scan line.

The scanner 12 is positioned above the symbol structure, and then the operator manually displaces the scanner along the transverse direction until the scanner is positioned below the symbol structure. During this manual displacement, the preamble and postamble rows having the same row number are scanned by the same scan line, and each pair of correspondingly-numbered rows are scanned in time sequence. The photosensor on-board the scanner 12 detects the variable light intensity presented to the scan line of the preamble code, the occupied and non-occupied zones in the space, and the postamble code. As shown in FIG. 1, for scan line 30, which traverses row 3 of each preamble and postamble code means, each point of intersection of the signature 14 with the scan line 30 represents an occupied zone, and all non-intersecting points of the signature 14 with the scan line 30 represent non-occupied zones.

Analog electrical signals corresponding to each code means and the occupied and non-occupied zones are generated by the photosensor. These analog signals are digitized by an analog-to-digital converter and thereupon decoded in accordance with an algorithm under the control of a microprocessor. The decoded signals are stored in a memory component. The stored signals can be retrieved from the memory component, and the signature can be reconstructed on a display screen or printer.

In practice, the scan line cannot be precisely horizontally positioned on the symbol structure so that the scan line covers the same numbered row in both the preamble and postamble code means. Typically, the scan line is inclined with a non-zero slope, s shown for representative inclined scan line 32. Nevertheless, in an analogous manner to that described above, the scanner 12 is positioned above, nd manually displaced along the transverse direction to a position below the symbol. The preamble and postamble rows of each scan line are separately recorded, and the slope can be calculated since the dimensions of the space 16 are predetermined. Thus, for each scan line, the row number of the preamble of the traversed row is known, the row number of the postamble code means of the traversed row is known, and the occupied and non-occupied zones of the traversed scan line is known. All of this information is separately stored in a memory component and, when necessary, retrieved and reconstructed on a display screen or printer.

Rather than manually displacing the scanner in the transverse direction, the scan line can be itself automatically swept along the "Y" axis. For example, the output of the scanner need not be a single scan line as described above, but the scanner can be operated in a raster mode composed of a set of mutually parallel scan lines. See, for example, U.S. Pat. No. 4,816,661, the entire contents of which are hereby incorporated herein by reference.

The scanner 12 can be held in one's hand and positioned remotely from the indicia being scanned in a non-contact mode with the symbol structure (see FIG. 2), (see FIG. 3), can be positioned against the symbol structure in a contact mode. The scanner need not be displaceable by itself, but can be fixed in position as in the case of a scanning workstation 36 (see FIG. 4) in which it is the symbol structure 10 which is moved relative to the scanning workstation 36. For example, the symbol structure 10 can be moved past the fixed workstation 36 by being conveyed along a conveyor 38.

As shown in FIG. 5, a tracking label 40 is imprinted with the symbol structure 10. In addition, the label 40 contains a tracking number 42 which is a multiple-digit number in Arabic numerals which is human-readable. The label 40 also contains a UPC symbol 44 which is a machine-readable number read by an electro-optical scanner, and which decodes into the tracking number 42. The label further contains areas 46, 48 in which the weight and the shipper number of an article 50 to be delivered are affixed. The label 40 usually has a pressure-sensitive adhesive backing which is adhered to the article 50. Alternately, the label can be inserted in an envelope which itself is fixedly secured to the article 50.

As shown in FIGS. 2-4, when the label 40 is attached to article 50, a scanner such as 12, 34 or 36 can be used in conventional manner to read the UPC symbol 44 thereon. Simultaneously or subsequently, the scanner can be used to read the symbol structure 10 in which the signature 14 has been added to the space 16.

Although the signature capture feature has been described in connection with the acknowledgement of receipt of delivered articles, it has a wide variety of other uses. For example, in an electronic lock application, a sample authorized signature may be stored in a memory device and a subsequently rendered signature can be optically read and compared with the sample signature in order to gain or deny access to a secured location, in dependence upon whether or not a match has been made. The secured location can be any premises or such items as automated teller machines, automatic ticket machines, and like equipment.

The preamble code means 26 and the postamble code means 28 need not be located forwardly and rearwardly of the space 16 as considered along the longitudinal direction, as described above and illustrated in FIG. 1. The code means 26, 28 can be respectively located above and below the space 16 as considered along the transverse direction. Alternately, individual multi-row code means may be located forwardly, rearwardly, above and below the space 16, i.e. at all four boundaries thereof, to allow acquisition of the signature 14 or analogous image in both longitudinal and transverse orientations.

FIG. 6 depicts the preferred embodiment of an actual code means 26 or 28. The code means is two-dimensional and has sixteen rows, which provides adequate resolution of the image to be captured.

It will be understood that each of the elements described above, or two or more together, also may find a useful application in other types of constructions differing from the types described above.

While the invention has been illustrated and described as embodied in a signature capture using electro-optical scanning, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for electro-optically capturing indicia, comprising:
   (a) means defining a space for receiving indicia to be captured, said space including opposite boundaries spaced apart of each other and extending along a longitudinal direction, and also extending over a transverse distance along a transverse direction perpendicular to the longitudinal direction, said space having occupied zones containing indicia and non-occupied zones free of indicia;
   (b) multi-row preamble code means and multi-row postamble code means respectively located at the opposite boundaries of the space, each code means including electro-optically scannable and readable encoded data arranged in a plurality of ordered rows tiered along the transverse direction over the transverse distance of the space, each row extending along the longitudinal direction, the data in each row of each code means including row identifier data for identifying each row and start/stop data for identifying the boundaries of the space; and
   (c) scanner means for electro-optically scanning light along scan lines that extend over the space occupied by the indicia and over each code means, and for decoding the row identifier data and the start/stop data for each scan line as each scan line traverses the boundaries of the space, each scan line also traversing the occupied zones and the non-occupied zones, the occupied zones having a different light reflectivity than the non-occupied zones, said scanner means comprising
   (i) a housing,
   (ii) means in the housing for generating a beam spot exteriorly of the housing,
   (iii) means for sweeping the beam spot along mutually parallel sweep directions to form a raster pattern consisting of a plurality of mutually parallel scan lines,
   (iv) means for capturing the identity and the location of the occupied zones and the non-occupied zones, wherein the capturing means includes means for generating a digitized electrical signal having two states, each indicative of one of the occupied and non-occupied zones, and means for storing the digitized signal, and
   (v) means for retrieving the stored digitized signal and using the decoded row identifier data of the preamble code means and the postamble code means to compensate for skewing of the raster pattern with respect to the space for receiving indicia to thereby reconstruct the captured indicia, and
   (vi) means for displaying the reconstructed captured indicia.

2. The arrangement as claimed in claim 1, wherein the opposite boundaries of the space are end lines, and therein the transverse distance of the space is bounded by transversely-extending boundary lines.

3. The arrangement as claimed in claim 2, wherein the space is rectangular.

4. The arrangement as claimed in claim 1, wherein the means defining a space and each code means are printed on a label to be applied to an article whose receipt is to be acknowledged.

5. The arrangement as claimed in claim 4, wherein said space is of sufficient size to receive a signature of a recipient as said indicia.

6. The arrangement as claimed in claim 1, wherein each code means is a two-dimensional bar code.

7. The arrangement as claimed in claim 1, wherein the housing forms a hand-held head moveable by an operator.

8. The arrangement as claimed in claim 7, wherein the scanner means includes a laser light source, and wherein the laser scan line is visible across the space and each code means.

9. An arrangement for electro-optically capturing a signature made to acknowledge receipt of an article, comprising:
   (a) means on the article for defining a space for receiving a receipt acknowledgement signature to be captured, said space including opposite boundaries spaced apart of each other and extending along a longitudinal direction, and also extending over a transverse direction along a transverse direction perpendicular to the longitudinal direction, said space having occupied zones containing a signature and non-occupied zones free of a signature;
   (b) multi-row preamble code means and multi-row postamble code means respectively located at the opposite boundaries of the space, each code means including electro-optically scannable and readable encoded data arranged in a plurality of ordered rows tiered along the transverse direction over the transverse distance of the space, each row extending along the longitudinal direction, the data in each row of each code means including row identifier data for identifying each row and start-stop data for identifying the boundaries of the space; and (c) scanner means for electro-optically scanning light along scan lines that extend over the space occupied by the signature and over each code means, and for decoding the row identifier data and the start/stop data for each scan line as each scan line traverses the boundaries of the space, each scan line also traversing the occupied zones and the non-occupied zones, the occupied zones having a different light reflectivity than the non-occupied zones, said scanner means comprising (i) a housing, (ii) means in the housing for generating a beam spot exteriorly of the housing, (iii) means for sweeping the beam spot along mutually parallel sweep directions to form a raster pattern consisting of a plurality of mutually parallel scan lines, (iv) means for capturing the identity and the location of the occupied zones and the non-occupied zones, wherein the capturing means includes means for generating a digitized electrical signal having two states, each indicative of one of the occupied and non-occupied zones, means for storing the digitized signal, and (v) means for retrieving the stored digitized signal and using the decoded row identifier data of the preamble code means and the postamble code means to compensate for skewing of the raster pattern with respect to the space to thereby reconstruct the captured signature, and (vi) means for displaying the reconstructed captured signature.

10. A method of electro-optically capturing indicia, comprising the steps of:

(a) defining a space having an array of zones and opposite boundaries and extending along a longitudinal direction, and also extending over a transverse distance along a transverse direction perpendicular to the longitudinal direction;

(b) marking indicia to be captured in the space;

(c) respectively locating multi-row preamble code means and multi-row postamble code means at the opposite boundaries of the space, each code means including electro-optically scannable and readable encoded data arranged in a plurality of rows tiered along the transverse direction over the entire transverse distance of the space, each row extending along the longitudinal direction, the data in each row of each code means including row identifier data for identifying each row, and start/stop data for identifying the boundaries of the space;

(d) successively electro-optically scanning light along mutually parallel scan lines to form a raster pattern consisting of a plurality of mutually parallel scan lines that extend over the space occupied by the indicia and over each code means;

(e) decoding the row identifier data and the start/stop data in both the preamble code and the postamble code for each scan line as each scan line traverses the boundaries of the space;

(f) capturing the identity and the location of the occupied zones and the non-occupied zones as each scan line traverses occupied zones having indicia and non-occupied zones free of indicia, the occupied zones having a different light reflectivity than the non-occupied zones;

(g) using the decoded row identifier data from both the preamble code means and the postamble code means to compensate for skewing of the raster pattern with respect to the space to thereby reconstruct the captured indicia; and (h) displaying the reconstructed captured indicia.

11. The method as claimed in claim 10, wherein the defining step is performed by forming the space with a rectangular shape.

12. The method as claimed in claim 10, wherein the defining step and the locating step are simultaneously performed by printing the boundaries of the space and each code means on a label.

13. The method as claimed in claim 12; and further comprising the step of applying the label to an article whose receipt is to be acknowledged.

14. The method as claimed in claim 10, wherein the marking step is performed by signing one's name.

* * * * *